United States Patent
Ju et al.

(10) Patent No.: US 10,884,521 B2
(45) Date of Patent: Jan. 5, 2021

(54) DIAL DEVICE AND RELATED INTERACTIVE DISPLAY DEVICE CAPABLE OF DETERMINING A ROTATION ANGLE

(71) Applicant: ACER INCORPORATED, New Taipei (TW)

(72) Inventors: Tai Ju, New Taipei (TW); Chueh-Pin Ko, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/562,421

(22) Filed: Sep. 5, 2019

(65) Prior Publication Data

US 2020/0174585 A1   Jun. 4, 2020

(30) Foreign Application Priority Data

Dec. 3, 2018 (TW) .............................. 107143223 A (51) Int. Cl.
| | |
|---|---|
| *G06F 3/041* | (2006.01) |
| *G06F 3/0362* | (2013.01) |
| *G06F 3/0484* | (2013.01) |
| *G06F 3/038* | (2013.01) |
| *G06F 3/039* | (2013.01) |

(52) U.S. Cl.
CPC ............ *G06F 3/0362* (2013.01); *G06F 3/038* (2013.01); *G06F 3/04162* (2019.05); *G06F 3/04845* (2013.01); *G06F 3/0393* (2019.05)

(58) Field of Classification Search
CPC .... G06F 3/0362; G06F 3/038; G06F 3/04845; G06F 3/04162; G06F 3/0393
See application file for complete search history.

(56) References Cited

U.S. PATENT DOCUMENTS

| | | | |
|---|---|---|---|
| 2015/0169080 A1* | 6/2015 | Choi ..................... | G06F 3/0488 345/174 |
| 2015/0331539 A1* | 11/2015 | Chung .................. | G06F 3/0416 345/173 |
| 2016/0313797 A1* | 10/2016 | Daguet ............... | G06F 3/04886 |
| 2018/0024649 A1* | 1/2018 | Uno ...................... | G06F 3/0362 345/174 |
| 2018/0074639 A1* | 3/2018 | Powell .................... | G06F 3/044 |
| 2018/0129335 A1* | 5/2018 | Stone .................... | G06F 3/0416 |
| 2018/0285548 A1* | 10/2018 | Hamlin ................... | G06F 21/36 |
| 2018/0373351 A1* | 12/2018 | Sawada ................. | G06F 3/0383 |
| 2019/0025944 A1* | 1/2019 | Konishi ............... | G06F 1/1698 |
| 2019/0113985 A1* | 4/2019 | Sawada ............... | G06F 3/03548 |

(Continued)

*Primary Examiner* — Adam J Snyder
(74) *Attorney, Agent, or Firm* — Winston Hsu (57) ABSTRACT

A dial device including an upper case and a bottom base disposed with an electrode pattern having a directional pattern corresponding to a direction, wherein an interactive display device utilizes the dial device as an input device (such as a mouse or a rocker capable of instructing an index displayed by a screen to move toward the direction) according to moving signals transmitted by the dial device and sensing signals generated by a touch circuit of the interactive display device. Thus, the interactive display device is capable of mapping a direction caused by relative motions between the upper case and the bottom base to a moving direction of an object displayed by the interactive display device, so as to increase an operation of the dial device.

18 Claims, 8 Drawing Sheets

(56) References Cited

U.S. PATENT DOCUMENTS

| | | | |
|---|---|---|---|
| 2020/0004348 A1* | 1/2020 | Knoppert | G06F 3/0362 |
| 2020/0004356 A1* | 1/2020 | Morrison | G06F 3/0393 |
| 2020/0081557 A1* | 3/2020 | Togashi | G06F 3/0393 |

* cited by examiner

DIAL DEVICE AND RELATED INTERACTIVE DISPLAY DEVICE CAPABLE OF DETERMINING A ROTATION ANGLE

BACKGROUND OF THE INVENTION

1. Field of the Invention

The present invention relates to a dial device and related interactive display device, and more particularly, to a dial device and related interactive display device capable of determining a rotation angle.

2. Description of the Prior Art

As the development and applications of touch control panel and the population of various kinds of electronic products grow, in order to allow users to finish their works through more operations and input ways, there are different kinds of auxiliary input devices in the market, such as a touch control pen, a dial device, and so on. When the dial device is connected to the electronic product, a user may press the dial device to input a confirm command to the electronic product, and rotate the dial device to input a change selection command to the electronic product.

Commonly, a dial device is equipped with an upper case and a bottom base, and designed with a circle shape for rotation operation. When it is desired to use the dial device as a pointing input device (e.g., used as a mouse or a rocker to move an index on the screen toward a desired direction), a relative location between the dial device and the electronic device may not be accurate enough for input operation, or the electronic device cannot map a direction corresponding to a relative movement between the upper case and the bottom base to a moving direction corresponding to a display image after the dial device has been rotated, which limited operations of the dial device.

SUMMARY OF THE INVENTION

It is therefore an objective of the present invention to provide a dial device and related interactive display device adaptive to rotating signal and moving signal inputted by a user.

The present invention discloses a dial device configured to couple to an interactive display device. The dial device includes a bottom base comprising an electrode pattern configured to couple to a touch control circuit of the interactive display device; an upper case disposed on the bottom base, and capable of performing a relative movement and a relative rotation relative to the bottom base; a plurality of sensing elements configured to sense the moving operation between the upper case and the bottom base to correspondingly generate a plurality of moving signals, and configured to sense the rotating operation between the upper case and the bottom base to correspondingly generate a plurality of rotating signals; a first communication circuit couple to the plurality of sensing elements, and configured to transmit the plurality of moving signals and the plurality of rotating signals to the interactive display device. Wherein the electrode pattern has a directivity, when the upper case moves relative to the bottom base toward a first direction moving of the interactive display device, the plurality of sensing elements correspondingly generates a plurality of first moving signals, the plurality of first moving signals is transmitted to the interactive display device by the first communication circuit, thereby an image object displayed by the interactive display device moves toward the first direction; when the upper case moves relative to the bottom base toward a second direction of the display, the plurality of sensing elements correspondingly generates a plurality of second moving signals, the plurality of second moving signals is transmit to the interactive display device by the first communication circuit, thereby the image object displayed by the interactive display device moves toward the second direction moving; and the first direction is perpendicular to the second direction.

The present invention discloses an interactive display device configured to couple to a dial device; wherein the dial device comprises a bottom base, an upper case and a plurality of sensing elements, the bottom base comprises an electrode pattern with a directivity, the plurality of sensing elements is configured to sense a relative movement between the upper case and the bottom base to correspondingly generate a plurality of moving signals, and the plurality of sensing elements is configured to sense a relative rotation between the upper case and the bottom base to correspondingly generate a plurality of rotating signals. The interactive display device includes a display; a touch control circuit configured to sense the electrode pattern to generate a plurality of first sensing signals; a second communication circuit configured to receive the plurality of moving signals; and a control circuit coupled to the touch control circuit, the second communication circuit and the display, and configured to make an image object displayed by the display show a visual effect according to the plurality of first sensing signals and the plurality of moving signals. Wherein the electrode pattern has a directivity, when the upper case moves relative to the bottom base toward a first direction moving of the interactive display device, the plurality of sensing elements correspondingly generates a plurality of first moving signals, the plurality of first moving signals is transmitted to the interactive display device by the first communication circuit, thereby an image object displayed by the interactive display device moves toward the first direction; when the upper case moves relative to the bottom base toward a second direction of the display, the plurality of sensing elements correspondingly generates a plurality of second moving signals, the plurality of second moving signals is transmit to the interactive display device by the first communication circuit, thereby the image object displayed by the interactive display device moves toward the second direction moving; and the first direction is perpendicular to the second direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
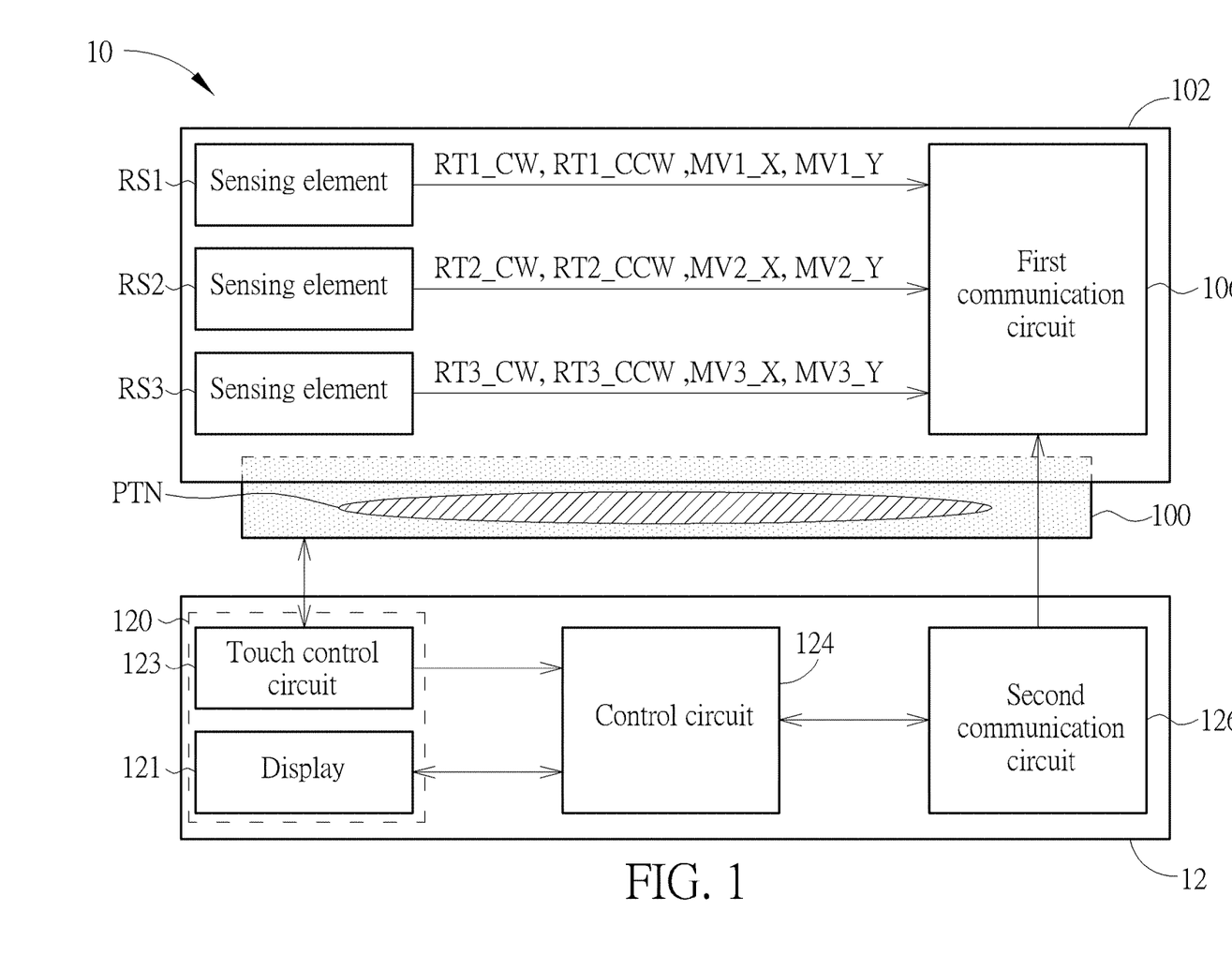
FIG. 1, FIG. 2 and FIG. 3 is a functional block diagram, interactive display device and a top view of a dial device and an interactive display device according to an embodiment of the present invention, respectively.
Figure 2:
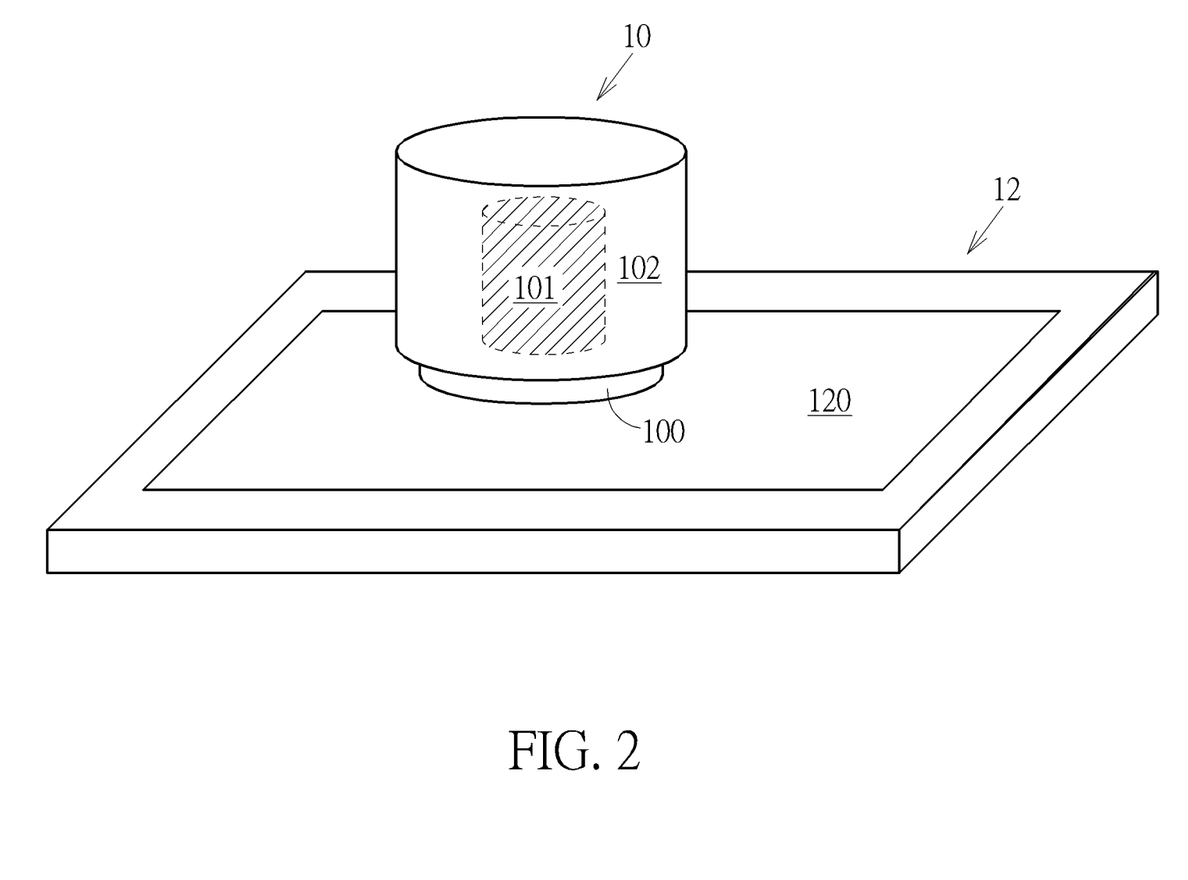
Figure 3:
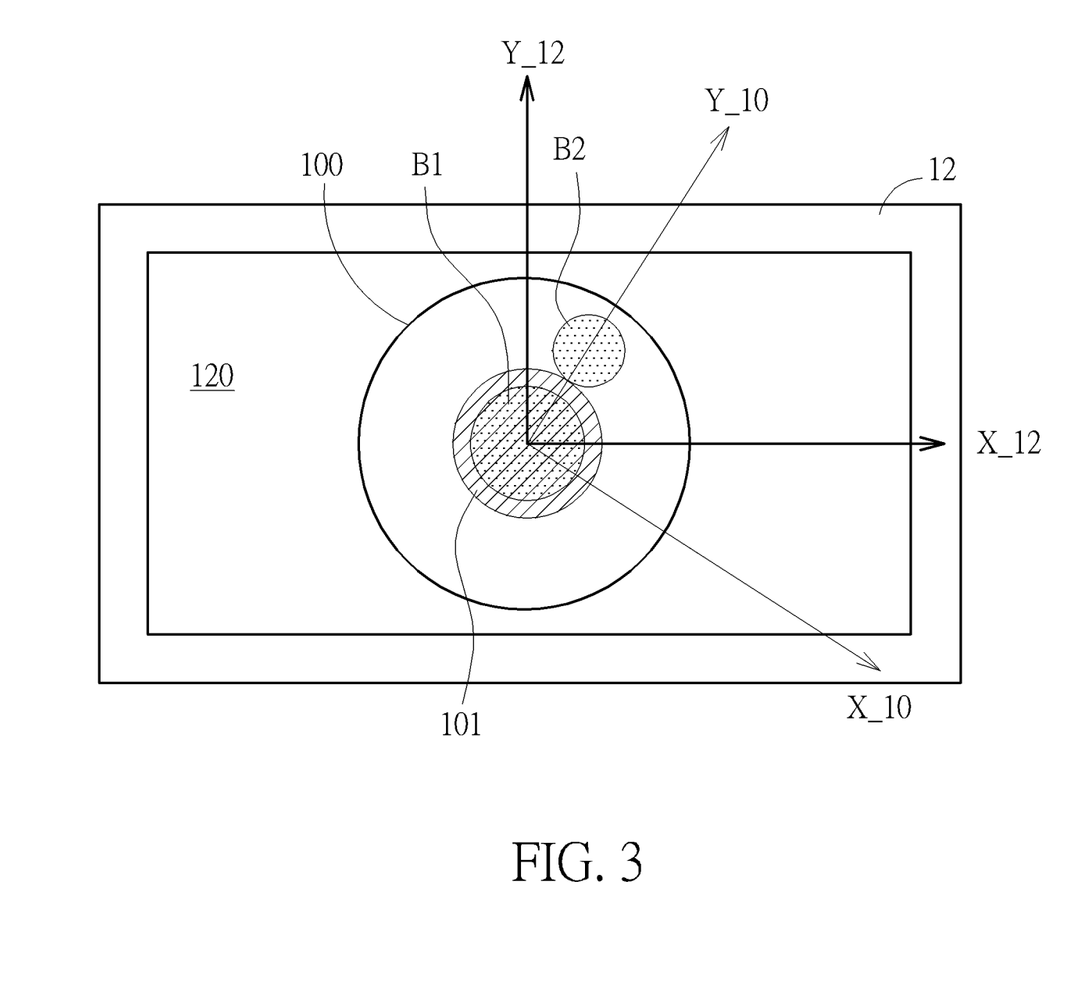

FIG. 1, FIG. 2 and FIG. 3 is a functional block diagram, interactive display device and a top view of a dial device 10 and an interactive display device 12 according to an embodiment of the present invention, respectively. In FIG. 1, the dial device 10 includes a bottom base 100, an upper case 102, a first communication circuit 106, and a plurality of sensing elements RS1, RS2 and RS3. The interactive display device 12 includes a control circuit 124, a second communication circuit 126, and a touch control display 120, wherein the touch control display 120 includes a display 121 and a touch control circuit 123.

In FIG. 2, the interactive display device 12 may be an electronic device having a touch control display 120, such as a 360-degree flip over laptop computer, a 2-in-1 computer, a tablet computer, an all in one (AIO) computer, and so on. In this embodiment, a tablet computer is used for example, which is not limited.

The bottom base 100 includes an electrode pattern PTN disposed for coupling to the touch control circuit 123 of the interactive display device 12. The upper case 102 is disposed in the bottom base 100, and able to perform a movement and a rotation relative to the bottom base 100. The plurality of sensing elements RS1, RS2 and RS3 is used for sensing moving operations between the upper case 102 and the bottom base 100 to correspondingly generate a plurality of moving signals, and used for sensing rotating operations between the upper case 102 and the bottom base 100 to correspondingly generate a plurality of rotating signals RT1, RT2 and RT3. The electrode pattern PTN has a directivity, when the upper case 102 moves relative to the bottom base 100 toward a first direction (e.g., X direction) of the display 121 of the interactive display device 12, the sensing elements RS1, RS2 and RS3 may correspondingly generate a plurality of first moving signals MV1_X, MV2_X and MV3_X, and the first communication circuit 106 may transmit the plurality of first moving signals MV1_X, MV2_X and MV3_X to the interactive display device 12. Then, an image object displayed by the display 120 may move toward the first direction (e.g., move toward the X direction). When the upper case 102 moves relative to the bottom base 100 toward a second direction moving (e.g., Y direction) of the display 121 of the interactive display device 12, the sensing elements RS1, RS2 and RS3 may correspondingly generate a plurality of second moving signals MV1_Y, MV2_Y and MV3_Y, and the first communication circuit 106 may transmit the plurality of second moving signals MV1_Y, MV2_Y and MV3_Y to the interactive display device 12. Then, the image object displayed by the display 120 may move toward the second direction moving (e.g., move toward Y direction). The first direction is perpendicular to the second direction (e.g., the X direction is perpendicular to the Y direction).

The first communication circuit 106 is coupled to the sensing elements RS1, RS2 and RS3, and used for connecting to the interactive display device 12 through wireless communication technology (e.g., WiFi, Bluetooth) to transmit the first moving signals MV1_X, MV2_X and MV3_X and the second moving signals MV1_Y, MV2_Y and MV3_Y to the interactive display device 12.

In one embodiment, when the upper case 102 rotates clockwise relative to the bottom base 100, the plurality of sensing elements RS1, RS2 and RS3 correspondingly generate a plurality of first rotating signals RT1_CW, RT2_CW and RT3_CW; when the upper case rotates counter clockwise relative to the bottom base, the plurality of sensing elements RS1, RS2 and RS3 correspondingly generate a plurality of second rotating signals RT1_CCW, RT2_CCW and RT3_CCW. The plurality of first rotating signals RT1_CW, RT2_CW and RT3_CW and the plurality of second rotating signals RT1_CCW, RT2_CCW and RT3_CCW are transmit to the interactive display device 12 by the first communication circuit 106, and the image object displayed by the display 120 shows a clockwise rotating visual effect and a counter clockwise rotating visual effect, respectively.

In FIG. 3, the electrode pattern (denoted with dot patterns) of the bottom base 100 includes two circle electrodes B1 and B2 with different areas. The only symmetry line of the electrode pattern (e.g., a line connecting centers of the circle electrodes B1 and B2) may be defined as a pointing direction Y_10, and the pointing direction Y_10 and a perpendicular direction X_10 may form a two dimensional coordinate system. The sensing elements RS1, RS2 and RS3 is respectively disposed at 0 degree, 120 degrees, 240 degrees around the bearing 101 (denoted with slash patterns), which is not limited. In addition, the touch control display 120 may form another tow dimensional coordinate system with a perpendicular direction X_12 and a pointing direction Y_12.

When the dial device 10 is disposed in a sensing area of the touch control display 120, a rotation angle θ between the two coordinate systems may be obtained according to inductions between the touch control display 120 and the circle electrodes B1 and B2. After the interactive display device 12 has obtained the relative rotation angle θ of the two coordinate systems, the relative rotation angle θ may be used as a calibration parameter for the following transmitted data of the dial device 10 (e.g., moving signals and rotating signals) to perform calibration and image processing, thereby generating various interactive display scenes.

FIG. 4A to FIG. 4E is a schematic diagram of an electrode pattern PTN according to various embodiments of the present invention. In one embodiment, the electrode pattern PTN is not symmetry about any straight line or is symmetry about at most one straight line.

Figure 4A:
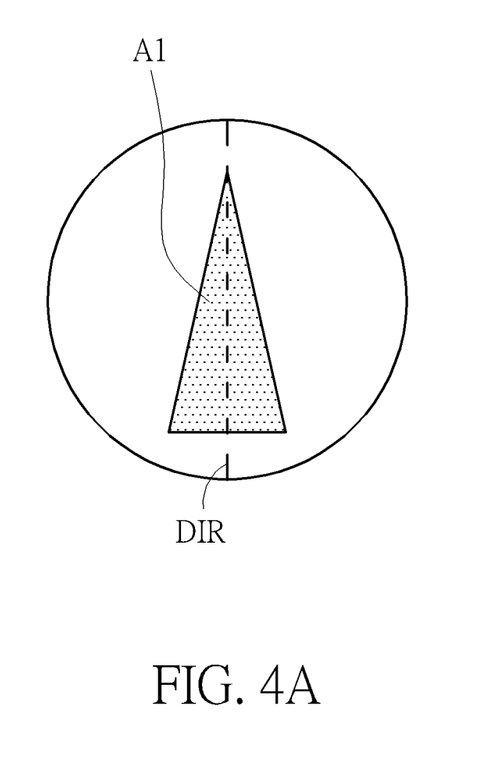
FIG. 4A to FIG. 4E is a schematic diagram of an electrode pattern according to various embodiments of the present invention.
Figure 4B:
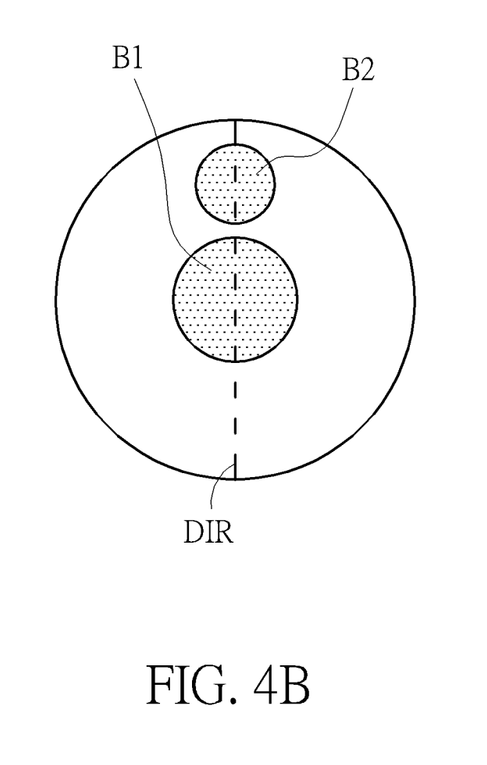
Figure 4C:
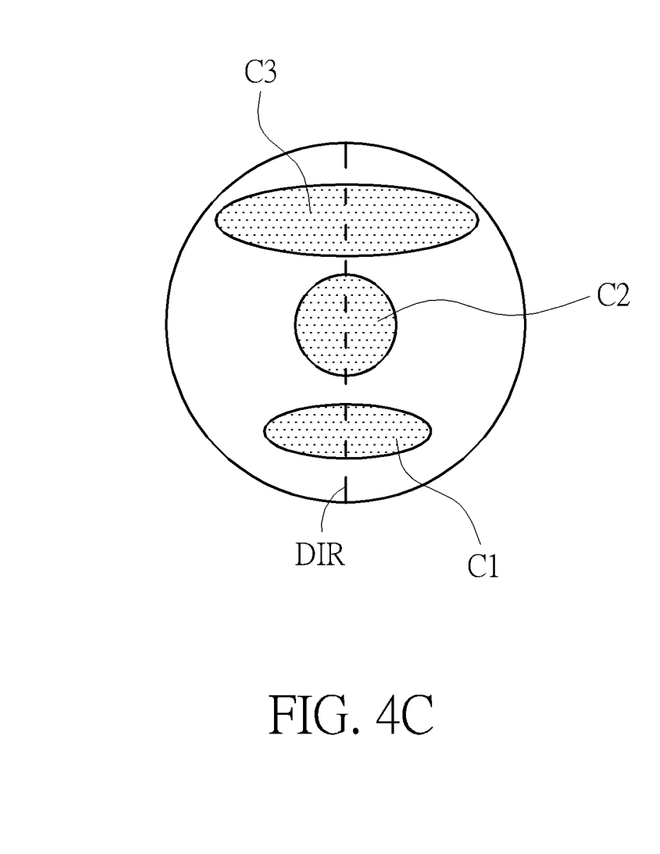
Figure 4D:
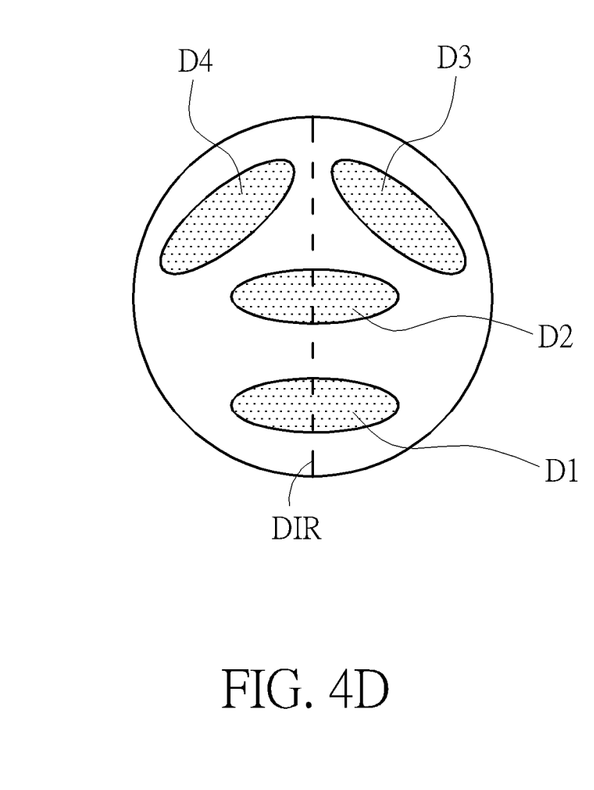

In FIG. 4A, the electrode pattern PTN is an isosceles triangle electrode A1, and a pointing direction DIR corresponding to the electrode pattern PTN is parallel to a symmetry line of the isosceles triangle electrode A1. In FIG. 4B, the electrode pattern PTN includes two circle electrodes B1 and B2 with different areas, and a pointing direction DIR corresponding to the electrode pattern PTN is parallel to a line connecting the centers of the two circle electrodes B1 and B2. In FIG. 4C, the electrode pattern PTN includes two ellipse electrodes C1 and C2 and one circle electrode C3 with different areas, and a pointing direction DIR corresponding to the electrode pattern PTN is parallel to a line connecting centers of the two ellipse electrodes C1 and C2 and the one circle electrode C3. In FIG. 4D, the electrode pattern PTN includes four ellipse electrodes D1, D2, D3 and D4 with a same area, and a pointing direction DIR corresponding to the electrode pattern PTN is parallel to a line connecting centers of the two ellipse electrodes D1 and D2 and a symmetry line of the two ellipse electrodes D3 and D4.

In other words, the touch control circuit 123 may provide sensing signals generated by inductions from the electrode pattern PTN to the control circuit 124, and the control circuit 124 may determine location, distribution, shape, and pattern according to the sensing signals to determine the only symmetry line of the electrode pattern PTN, so as to determine the pointing direction DIR. As a result, once the coordinate system formed by the directions X_12 and Y_12 of the touch control circuit 123 is given, the control circuit 124 may determine the coordinate system formed by the directions X_10, Y_10 and the pointing direction DIR of the electrode pattern PTN, thereby determining the relative rotation angle θ of the two coordinate systems.

Figure 4E:
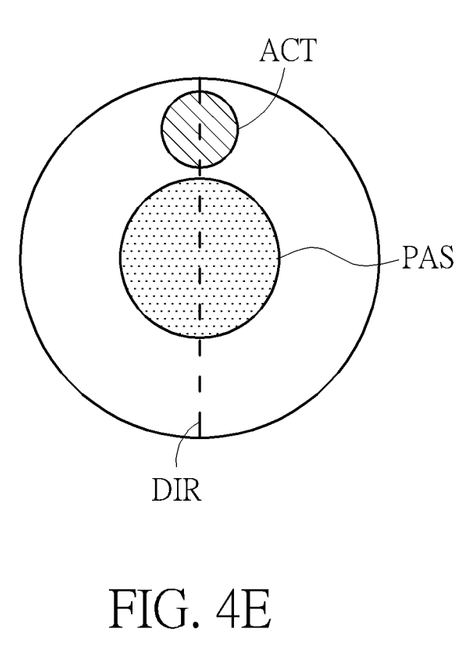

In FIG. 4E, the electrode pattern PTN includes an active electrode area ACT and a passive electrode area PAS, the first active electrode area may transmit a first active signal to the touch control circuit 123, the passive electrode area may not transmit any signal to the touch control circuit 123. Areas and shapes of the active electrode area ACT and the passive electrode area PAS may be the same or different, in this embodiment two circle electrodes with different areas are given for example, which is not limited.

In other embodiments, the electrode pattern PTN includes a first active electrode area and a second active electrode area, the first active electrode area may transmit a first active signal to the touch control circuit 123, the second active electrode area may transmit a second active signal to the touch control circuit 123, and the first active signal is different from the second active signal.

Figure 5:
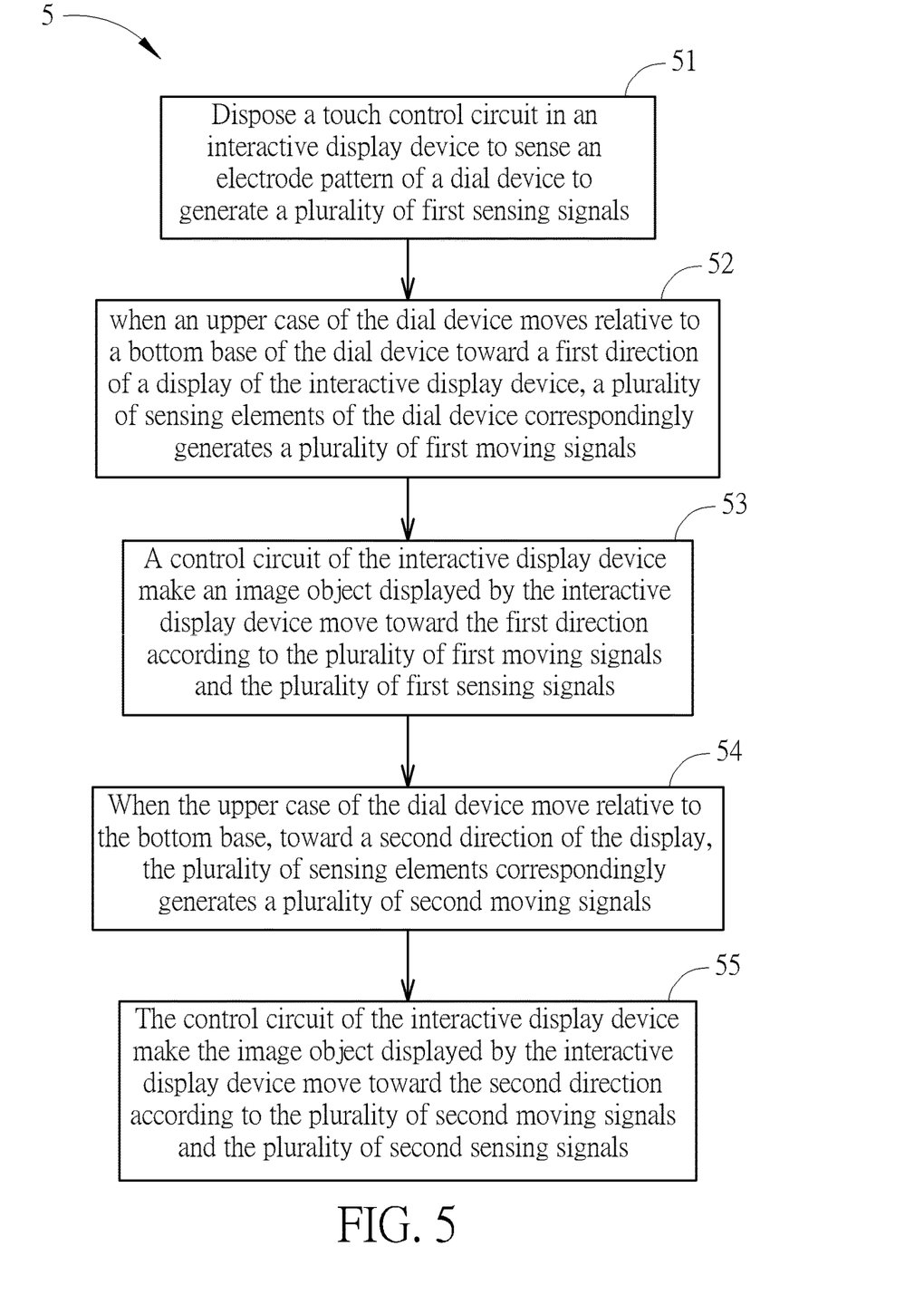
FIG. 5 is a flowchart of an interactive display operation according to an embodiment of the present invention.

Operations about the dial device 10 and the interactive display device 12 may be summarized into an interactive display operating process 5, as shown in FIG. 5, wherein the interactive display operating process 5 includes the following steps.

Step 51: Dispose a touch control circuit in an interactive display device to sense an electrode pattern of a dial device to generate a plurality of first sensing signals.

Step 52: when an upper case of the dial device moves relative to a bottom base of the dial device toward a first direction of a display of the interactive display device, a plurality of sensing elements of the dial device correspondingly generates a plurality of first moving signals.

Step 53: A control circuit of the interactive display device make an image object displayed by the interactive display device move toward the first direction according to the plurality of first moving signals and the plurality of first sensing signals.

Step 54: When the upper case of the dial device move relative to the bottom base, toward a second direction of the display, the plurality of sensing elements correspondingly generates a plurality of second moving signals.

Step 55: The control circuit of the interactive display device make the image object displayed by the interactive display device move toward the second direction according to the plurality of second moving signals and the plurality of second sensing signals.

Detailed operations regarding the interactive display operating process 5 may be obtained by referring to descriptions regarding FIG. 1 to FIG. 3 and FIG. 4A to FIG. 4D (embodiments including the passive electrodes), which is omitted.

Figure 6:
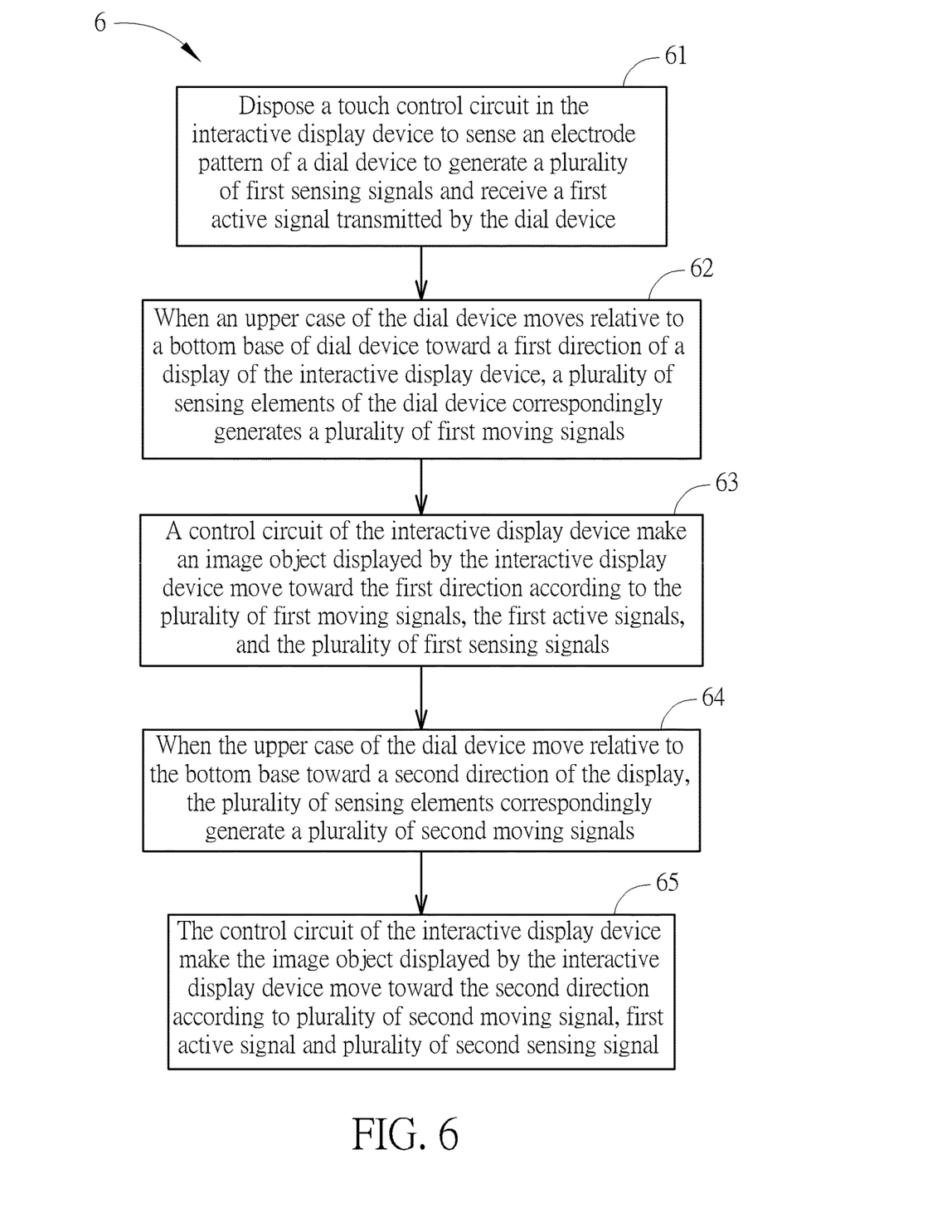
FIG. 6 is a flowchart of an interactive display operation according to another embodiment of the present invention.

Operations about the dial device 10 and the interactive display device 12 may be summarized into an interactive display operating process 6, as shown in FIG. 6, wherein the interactive display operating process 6 includes the following steps.

Step 61: Dispose a touch control circuit in the interactive display device to sense an electrode pattern of a dial device to generate a plurality of first sensing signals and receive a first active signal transmitted by the dial device.

Step 62: When an upper case of the dial device moves relative to a bottom base of dial device toward a first direction of a display of the interactive display device, a plurality of sensing elements of the dial device correspondingly generates a plurality of first moving signals.

Step 63: A control circuit of the interactive display device make an image object displayed by the interactive display device move toward the first direction according to the plurality of first moving signals, the first active signals, and the plurality of first sensing signals.

Step 64: When the upper case of the dial device move relative to the bottom base toward a second direction of the display, the plurality of sensing elements correspondingly generate a plurality of second moving signals.

Step 65: The control circuit of the interactive display device make the image object displayed by the interactive display device move toward the second direction according to plurality of second moving signal, first active signal and plurality of second sensing signal.

Detailed operations regarding the interactive display operating process 6 may be obtained by referring to descriptions regarding FIG. 1 to FIG. 3 and FIG. 4E (embodiment including the passive and active electrodes), which is omitted.

To sum up, the dial device of the present invention is disposed with an electrode pattern formed in the bottom base and with a pointing pattern corresponding to a pointing direction, the interactive display device may regard the dial device as a pointing input device (e.g., use the dial device as a mouse or a rocker to move an index on the screen toward a desired direction) according to a moving signal transmitted by the dial device and a sensing signal generated by sensing the electrode pattern by the touch control circuit, therefore the interactive display device may correspond the direction corresponding to a relative movement between the upper case and the bottom base to a moving direction of displayed object, which adds an operation of the dial device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dial device configured to couple to an interactive display device, comprising:
   a bottom base comprising an electrode pattern configured to couple to a touch control circuit of the interactive display device;
   an upper case disposed on the bottom base, and capable of performing a relative movement and a relative rotation relative to the bottom base;
   a plurality of sensing elements configured to sense the moving operation between the upper case and the bottom base to correspondingly generate a plurality of moving signals, and configured to sense the rotating operation between the upper case and the bottom base to correspondingly generate a plurality of rotating signals;
   a first communication circuit couple to the plurality of sensing elements, and configured to transmit the plurality of moving signals and the plurality of rotating signals to the interactive display device;
   wherein when the upper case moves relative to the bottom base toward a first direction moving of the interactive display device, the plurality of sensing elements correspondingly generates a plurality of first moving signals, the plurality of first moving signals is transmitted to the interactive display device by the first communication circuit, thereby an image object displayed by the interactive display device moves toward the first direction; when the upper case moves relative to the bottom base toward a second direction of the display, the plurality of sensing elements correspondingly generates a plurality of second moving signals, the plurality of second moving signals is transmit to the interactive display device by the first communication circuit, thereby the image object displayed by the interactive display device moves toward the second direction moving; and the first direction is perpendicular to the second direction;

wherein the electrode pattern has a directivity, the interactive display device obtains a relative rotation angle between the dial device and the interactive display device according to a mutual induction between the dial device and the interactive display device, thereby the image object displayed by the interactive display device comprises an interactive display scene according to the relative rotation angle;

wherein the electrode pattern is not symmetry about any straight line.

2. The dial device of claim 1, wherein when the upper case rotates clockwise and relative to the bottom base, the plurality of sensing elements correspondingly generates a plurality of first rotating signals; when the upper case rotates counter clockwise and relative to the bottom base, the plurality of sensing element correspondingly generates a plurality of second rotating signals; and the plurality of first rotating signals and the plurality of second rotating signals are transmitted to the interactive display device by the first communication circuit, thereby the image object displayed by the interactive display device shows a clockwise rotating visual effect and a counter clockwise rotating visual effect, respectively.

3. The dial device of claim 1, wherein the electrode pattern comprises a first active electrode area and a passive electrode area, the first active electrode area transmits a first active signal to the touch control circuit, and the passive electrode area does not transmit any signal to the touch control circuit.

4. The dial device of claim 3, wherein the first active electrode area and the passive electrode area are circles, and a pointing line corresponding to the electrode pattern is parallel to a line connecting centers of the first active electrode area and the passive electrode area.

5. The dial device of claim 1, wherein the electrode pattern comprises a first active electrode area and a second active electrode area, the first active electrode area transmits a first active signal to the touch control circuit, the second active electrode area transmits a second active signal to the touch control circuit, and the first active signal is different from the second active signal.

6. The dial device of claim 1, wherein the electrode pattern is an isosceles triangle electrode, and a pointing direction corresponding to the electrode pattern is parallel to a symmetry line of the isosceles triangle electrode.

7. The dial device of claim 1, wherein the electrode pattern comprises a first circle electrode and a second circle electrode, an area of the first circle electrode is different from an area of the second circle electrode, and a pointing direction corresponding to the electrode pattern is parallel to a line connecting centers of the first circle electrode and the second circle electrode.

8. The dial device of claim 1, wherein the electrode pattern comprises a first ellipse electrode, a second ellipse electrode and a circle electrode, areas of the first ellipse electrode, the second ellipse electrode and the circle electrode are different, and a pointing direction corresponding to the electrode pattern is parallel to a line connecting centers of the first ellipse electrode, the second ellipse electrode and the one circle electrode.

9. The dial device of claim 1, wherein the electrode pattern comprises a first ellipse electrode, a second ellipse electrode, a third ellipse electrode and a fourth ellipse electrode, a pointing direction corresponding to the electrode pattern is parallel to a line a line connecting centers of the first ellipse electrode and the second ellipse electrode, and the third ellipse electrode and the fourth ellipse electrode are symmetry about the line.

10. An interactive display device configured to couple to a dial device; wherein the dial device comprises a bottom base, an upper case and a plurality of sensing elements, the bottom base comprises an electrode pattern with a directivity, the plurality of sensing elements is configured to sense a relative movement between the upper case and the bottom base to correspondingly generate a plurality of moving signals, and the plurality of sensing elements is configured to sense a relative rotation between the upper case and the bottom base to correspondingly generate a plurality of rotating signals; the interactive display device comprises:

a display;

a touch control circuit configured to sense the electrode pattern to generate a plurality of first sensing signals;

a second communication circuit configured to receive the plurality of moving signals; and a control circuit coupled to the touch control circuit, the second communication circuit and the display, and configured to make an image object displayed by the display show a visual effect according to the plurality of first sensing signals and the plurality of moving signals;

wherein when the upper case moves relative to the bottom base toward a first direction moving of the interactive display device, the plurality of sensing elements correspondingly generates a plurality of first moving signals, the plurality of first moving signals is transmitted to the interactive display device by the first communication circuit, thereby an image object displayed by the interactive display device moves toward the first direction; when the upper case moves relative to the bottom base toward a second direction of the display, the plurality of sensing elements correspondingly generates a plurality of second moving signals, the plurality of second moving signals is transmit to the interactive display device by the first communication circuit, thereby the image object displayed by the interactive display device moves toward the second direction moving; and the first direction is perpendicular to the second direction;

wherein the interactive display device obtains a relative rotation angle between the dial device and the interactive display device according to a mutual induction between the dial device and the interactive display device, thereby the image object displayed by the interactive display device comprises an interactive display scene according to the relative rotation angle;

wherein the electrode pattern is not symmetry about any straight line.

11. The interactive display device of claim 10, wherein when the upper case of the dial device rotates clockwise and relative to the bottom base, the plurality of sensing elements correspondingly generates a plurality of first rotating signals; when the upper case rotates counter clockwise and relative to the bottom base, the plurality of sensing element correspondingly generates a plurality of second rotating signals; and the control circuit receives the plurality of first rotating signals and the plurality of second rotating signals by the second communication circuit, and make the image object displayed by the display show a clockwise rotating visual effect and a counter clockwise rotating visual effect.

12. The interactive display device of claim 10, wherein the electrode pattern of the dial device comprises a first active electrode area and a passive electrode area, the first active electrode area transmits a first active signal to the touch control circuit, the passive electrode area does not transmit any signal to the touch control circuit; the control circuit make the image object displayed by the display move toward the first direction according to the first active signal, a plurality of second sensing signals corresponding to the passive electrode area and the plurality of first moving signals; and the control circuit make the image object displayed by the display move toward the second direction according to the first active signal, the plurality of second sensing signals and the plurality of second moving signals.

13. The interactive display device of claim 12, wherein the first active electrode area and the passive electrode area are circles, and a pointing line corresponding to the electrode pattern is parallel to a line connecting centers of the first active electrode area and the passive electrode area.

14. The interactive display device of claim 10, wherein the electrode pattern comprises a first active electrode area and a second active electrode area, the first active electrode area transmits a first active signal to the touch control circuit, the second active electrode area transmits a second active signal to the touch control circuit, the first active signal is different from the second active signal; the control circuit make the image object displayed by the display move toward the first direction according to the first active signal, the second active signal and the plurality of first moving signals; and the control circuit make the image object displayed by the display move toward the second direction according to the first active signal, the second active signal and the plurality of second moving signals.

15. The interactive display device of claim 10, wherein the electrode pattern is an isosceles triangle electrode, and a pointing direction corresponding to the electrode pattern is parallel to a symmetry line of the isosceles triangle electrode.

16. The interactive display device of claim 10, wherein the electrode pattern comprises a first circle electrode and a second circle electrode, an area of the first circle electrode is different from an area of the second circle electrode, and a pointing direction corresponding to the electrode pattern is parallel to a line connecting centers of the first circle electrode and the second circle electrode.

17. The interactive display device of claim 10, wherein the electrode pattern comprises a first ellipse electrode, a second ellipse electrode and a circle electrode, areas of the first ellipse electrode, the second ellipse electrode and the circle electrode are different, and a pointing direction corresponding to the electrode pattern is parallel to a line connecting centers of the first ellipse electrode, the second ellipse electrode and the one circle electrode.

18. The interactive display device of claim 10, wherein the electrode pattern comprises a first ellipse electrode, a second ellipse electrode, a third ellipse electrode and a fourth ellipse electrode, a pointing direction corresponding to the electrode pattern is parallel to a line a line connecting centers of the first ellipse electrode and the second ellipse electrode, and the third ellipse electrode and the fourth ellipse electrode are symmetry about the line.

* * * * *